United States Patent [19]
Cubalchini

[11] 3,858,046
[45] Dec. 31, 1974

[54] CATADIOPTRIC BEAMSPLITTER SYSTEM

[75] Inventor: Ronald Cubalchini, Santa Monica, Calif.

[73] Assignee: Hughes Aircraft Company, Culver City, Calif.

[22] Filed: Dec. 26, 1973

[21] Appl. No.: 428,262

Related U.S. Application Data

[62] Division of Ser. No. 373,522, June 25, 1973.

[52] U.S. Cl. .................. 250/353, 250/203, 250/226, 250/338
[51] Int. Cl. .......... G01j 1/20, G01j 3/50, G01t 1/16
[58] Field of Search ............ 250/226, 353, 338, 203

[56] References Cited
UNITED STATES PATENTS

| | | | |
|---|---|---|---|
| 2,972,743 | 2/1961 | Svensson | 250/353 |
| 3,114,149 | 12/1963 | Jessen, Jr. | 250/338 |
| 3,229,566 | 1/1966 | Hutchinson et al | 250/226 |
| 3,500,048 | 3/1970 | Menke | 250/203 |

*Primary Examiner*—Archie R. Borchelt
*Assistant Examiner*—T. N. Grigsby
*Attorney, Agent, or Firm*—W. H. MacAllister; R. A. Cardenas

[57] ABSTRACT

Optical systems especially suitable for tracking an object which emits infrared energy and directing a laser beam thereto are disclosed each including a lens and a first reflector for reflecting infrared energy to a first focal point and an interference filter being selectively reflective of laser energy and having a second focal point for directing laser energy to the target. The interference filter may be transmissive to infrared wavelengths of 3 to 5 microns and reflective to laser wavelengths of 10.6 microns.

7 Claims, 6 Drawing Figures ent of the present invention;

CATADIOPTRIC BEAMSPLITTER SYSTEM

This is a division of application Ser. No. 373,522, filed June 25, 1973.

RELATION TO GOVERNMENT CONTRACT

The invention herein described was made in the course of or under a contract or subcontract thereunder with the Department of the Air Force.

FIELD OF THE INVENTION

This invention relates generally to an electromagnetic energy transmission and reception system for simultaneously transmitting and receiving electromagnetic energy having different frequencies and wavelengths and utilizing the same optical system. In particular, this invention relates to an optical system which separates electromagnetic energy according to frequency and wavelengths by providing focal lengths that are frequency and wavelength dependent.

DESCRIPTION OF THE PRIOR ART

A system, including a laser for transmission and/or reception of electromagnetic energy at different frequencies and wavelengths has generally required the use of separate optical systems. There are several types of two-frequency optical systems. The first type uses separate apertures for the various frequencies and separate optics for each frequency. Separate apertures and corresponding optics presents problems of alignment between the two optical system, and also a two-aperture system requires an unnecessary amount of space. Another type is the polarization sharing method wherein energy of one frequency is polarized in one plane and energy of another frequency is polarized in the orthogonal plane. Although alignment is not an inherent shortcoming of the polarization sharing method, there is the problem that polarizing materials transmit energy in one plane and absorb the energy in the perpendicular plane. The absorption of a high energy signal may force the material to absorb a great amount of heat thereby inducing severe thermal problems. A third method that has been utilized is the temporal sharing method wherein one aperture is time shared by the two frequencies. The time sharing may be accomplished by a rotating prism, a shutter, or a flipping mirror. The main drawback in the temporal sharing method is in the mechanical structure used to accomplish the time sharing function. If a shutter or flipping mirror is used, a great amount of force must be exerted to move the shutter or mirror from one position to another within the given time constraints necessarily imposed by time sharing. If a rotating prism is used, it must have sufficient mass so that any disturbance of a vehicle carrying it does not interfere with its angular velocity. Another method is spectral sharing wherein the radiation is separated on the basis of wavelength. The main drawback to this type of application is that the port that transmits one wavelength will absorb energy from any other wavelength and there may be severe thermal problems if the amount of energy being absorbed is high enough.

SUMMARY OF THE INVENTION

Accordingly, it is the object of the present invention to provide a simple, reliable and accurate optical system for separating a plurality of wavelengths.

It is another object of the present invention to provide an optical system for a plurality of electromagnetic frequencies and wavelengths by providing focal lengths for the various energies according to their frequencies and wavelengths.

It is another object of the present invention to provide a catadioptric beamsplitter, heretofore used only as an aberration corrector, for providing wavelength dependent foci.

It is a further object of the present invention to provide an optical system utilizing a catadioptric beamsplitter for providing a first focus for a low power infrared energy beam having a first frequency and wavelength and a second focus for a high power laser energy beam having a second frequency and wavelength.

It is a still further object of the present invention to provide an optical system having a cooled catadioptric beamsplitter for transmitting a high power laser beam.

In accordance with the foregoing objects, an optical system according to the invention includes a first electromagnetic energy reflector having a first focus for energy having a first frequency and wavelength; a lens for providing optical power to said first reflector and a second electromagnetic energy reflector for reflecting energy having a second frequency and wavelength to a second focus and being transmissive to said first frequency and wavelength.

DETAILED DESCRIPTION OF THE DRAWINGS

Figure 1:
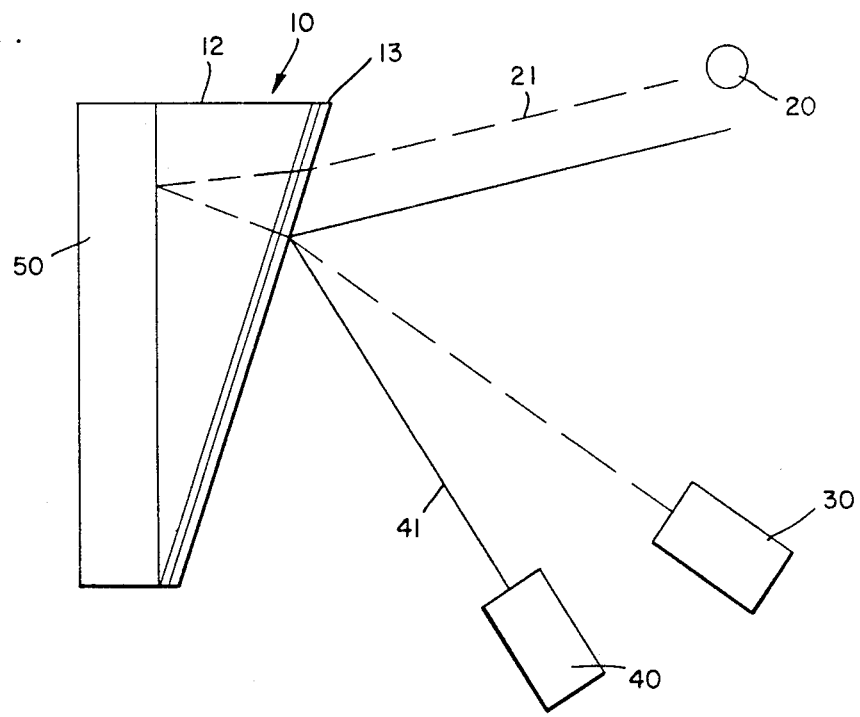
FIG. 1 is a schematic sectional view of a first embodiment of the present invention.

Referring more specifically to FIG. 1, a laser optical system is depicted for tracking a target by its infrared energy emission and directing a laser beam to that target. According to the present invention a laser optical system includes a catadioptric beamsplitter 10 having first and second reflecting surfaces. The beamsplitter 10 receives infrared energy 21 from a heat source 20 and that energy is reflected by the first reflecting surface to an infrared detector 30 which detector lies in a first direction with respect to the beamsplitter 10. The detector 30 may alternately be a visible light detector. Laser energy 41 from a laser 40 lying in a second direction with respect to the beamsplitter 10 is reflected by the second reflecting surface to the heat source 20. A cooling member 50 is attached to the beamsplitter 10 for conveying away any heat that the beamsplitter may have absorbed from the laser beam 41.

The catadioptric beamsplitter 10 includes a reflector 11, a lens 12 and a filer 13. The reflector 11 is the first reflecting surface for reflecting a wave having a first wavelength. The lens 12 provides optical power to a wave having a first wavelength. One side of the lens 12 is attached to the reflector 11. The filter 13 is disposed on the other side of the lens 12 and is the second reflecting surface for a wave having a second wavelength.

The reflector 11 may be any highly reflective surface which reflects electromagnetic energy having a first predetermined frequency and wavelength such as, for example, infrared wavelengths of 3 to 5 microns ($\mu$), or alternatively a laser beam of 10.6 microns ($\mu$). It is pointed out that the reflector 11 need not be restricted to reflecting the above two frequencies but any other suitable frequency and wavelength may be reflected. The reflector 11 material may be a metal, such as molybdenum, which may be polished to a high degree of luster or a filter comprising a quarter-wave stack (see infra). The shape of the reflector 11 is a flat two-dimensional surface.

The lens 12 is a wedge-shaped member for refracting a wave having a first frequency and wavelength passing therethrough and for providing optical power to the first reflecting surface 11. The wave 21 is shown as bending at the interface of the lens 12 and the filter 13. The reflector 11 is disposed immediately adjacent to the first surface of the lens 12. The lens 12 may be made of any appropriate material which refracts an electromagnetic wave having a first frequency and wavelength. A partial list of dielectric materials that may be used as a lens 12 for refracting signals with a wavelength of 3–5 microns includes: lead selenide, silicon, germanium, gallium arsenide, sapphire, and lead sulphide. The reflector 11 and the lens 12 may be joined in any of a number of ways. Replication bonding may be used to join a metal reflector and a dielectric lens 12. The reflector 11 may also be deposited onto one side of the lens 12 by chemical deposition or R. F. sputtering techniques, for example. The wedge thickness is dependent upon the amount of directional separation that is desired between the first and second wavelengths. Since the first and second reflecting surfaces (11 and 13) are at an angle to each other the first and second waves are reflected in different directions. The optical power provided by the lens 12 further separates the two waves. As an illustrative example, a wedgeshaped lens 12, made of zinc selenide material with a 2.41 index of refraction and having an overall length of 10 cm may be seen to vary in thickness from 1 micron to 100 microns from apex to base, respectively. It is noted that the higher the index of refraction the greater a given wavelength will be refracted as it passes through the lens or conversely, the less thickness variation is required from apex to base for a given refraction.

The filter 13 is an interference filter having the dual role of transmitting a first wave having a first frequency and wavelength and reflecting a second wave having a second frequency and wavelength. Such a filter may be a bandpass, stop pass, long pass, short pass filter or a combination thereof for selectively passing a signal of one wavelength while reflecting another. For example, a long pass optical filter may be used to pass a 10.6$\mu$ laser beam while reflecting an IR beam having a wavelength in the range of 3–5$\mu$. On the other hand, as discussed above, a short pass filter may be used to pass IR waves of 3–5$\mu$ while reflecting a 10.6$\mu$ wavelength. Also, a bandpass filter that passes 5–15$\mu$ wavelengths may be used along with a long pass filter that passes wavelengths greater than 10$\mu$, for example. Such a bandpass-long pass combination results in passing only wavelengths of 10–15$\mu$ while reflecting all others. The filter 13 may be vacuum deposited, for example, according to standard industry practices on the second surface of the wedge-shaped lens 12 and may consist of a quarter-wave optical stack or an anti-reflection coating. For a detailed discussion of the operation of an interference filter see discussion under FIG. 2.

The back of the catadioptric beamsplitter 10 may be attached to a cooling member 50 for conducting away any heat that may be absorbed by the reflector 11, the lens 12 or the filter 13. The cooling member 50 may be any convenient heat exchanger such as a water-cooled radiator, etc.

The operation of the first embodiment of the present invention according to FIG. 1 will now be described. The catadioptric beamsplitter 10 is directed at a distant target heat source 20 which emits infrared energy 21 having a wavelength in the range of 3–5$\mu$. The infrared wave 21 impinges upon the catadioptric beamsplitter 10 and passes through the interference filter 13. The wave 21 is refracted by a lens 12 and then reflected by the reflector 11 in a first direction to an infrared detector 30. A laser 40, illustrated as lying in a different direction from the infrared detector 30, and aimed at the beamsplitter 10 emits a beam 41 having a wavelength of 10.6$\mu$, which laser beam is reflected by the interference filter 13 to the target 20. As pointed out above, the roles of the reflector 11 and the interference filter 13 may be interchanged so that the reflector 11 reflects the laser wavelength of 10.6$\mu$ and the interference filter 13 reflects the IR energy of 3–5$\mu$ wavelength. If a high power laser is used then the cooling member 50 would conduct away any heat that is absorbed by the catadioptric beamsplitter 10. It is also within the scope of the present invention that the laser 40 may be capable of receiving reflected laser energy of 10.6$\mu$ from the distant target 20 in a direction opposite to that shown by the arrows in rays 41.

Figure 2:
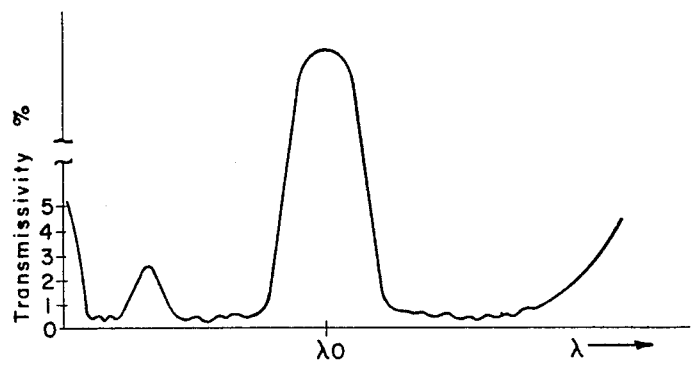
FIG. 2 is a graph representing transmittance of a simple interference filter.

Referring now to FIG. 2, a quarter-wave stack optical filter is a periodic array of alternating H and L layers, viz. HLHL ... H refers to a layer of optical material, such as germanium, with a thickness equal to one-quarter of the wavelength of interest and having a relatively high index of refraction, such as 4.00. L refers to an optical material, such as zinc sulfide, with a thickness equal to one-quarter of the wavelength of interest and having a relatively lower index of refraction such as 2.22. A quarterwave stack optical filter may be configured in a number of ways depending upon whether reflection or transmission of a particular wavelength is desired. If transmission through the filter 13 of a wavelength of interest is desired, then generally an even number of quarter-wave thick optical layers is used. If, however, reflection of a wavelength of interest is desired, then an odd number of quarter-wave thick optical layers is used, with the H layer preceding the L layer, i.e., the H layer receives the incoming wave first. The graph of FIG. 2 illustrates the transmittance of a typical two-layer LH quarter-wave stacked optical filter versus wavelength. For purposes of discussion it will be assumed that peak transmittance through the filter 13 will occur at $\lambda_o$ — the wavelength of interest. It is further assumed that the filter generally reflects other wavelengths but that there may be secondary bandpass regions. Each layer of the filter is $\lambda_o/4$ thick and the layers are arranged so that the light wave enters the L layer first. An interference filter function is determined by the relative indices of refraction between adjacent mediums within which the wave travels. If there is a minimal mismatch in indices of refractions of adjacent mediums, then there will be minimal reflection and maximum transmittance.

An example of mediums which provide a minimal mismatch are air and zinc sulfide having indices of refraction of 1.0 and 2.22, respectively. If, on the other hand, reflection of the wavelength of interest is desired, then there must be a relatively large difference in indices of refraction of adjacent mediums. This results in minimum transmittance and maximum reflection. An example of mediums which provide a maximum mismatch are air and germanium having indices of refraction of 1.0 and 4.00, respectively. So if transmittance of a wavelength of interest is desired, the first layer to receive the incoming wave would be the layer having the relatively lower index of refraction (L) followed by the relatively higher index of refraction (H) and if the wavelength of interest is to be reflected by the filter, the H layer is placed first followed by the L layer.

As discussed above, an antireflection coating may be used in addition to or in lieu of an interference filter as just described. An antireflection coating reduces the fresnel reflection losses of a wave having a particular wavelength and thereby enhances the transmission of the wavelength of interest through the coating while reflecting other wavelengths.

Figure 3:
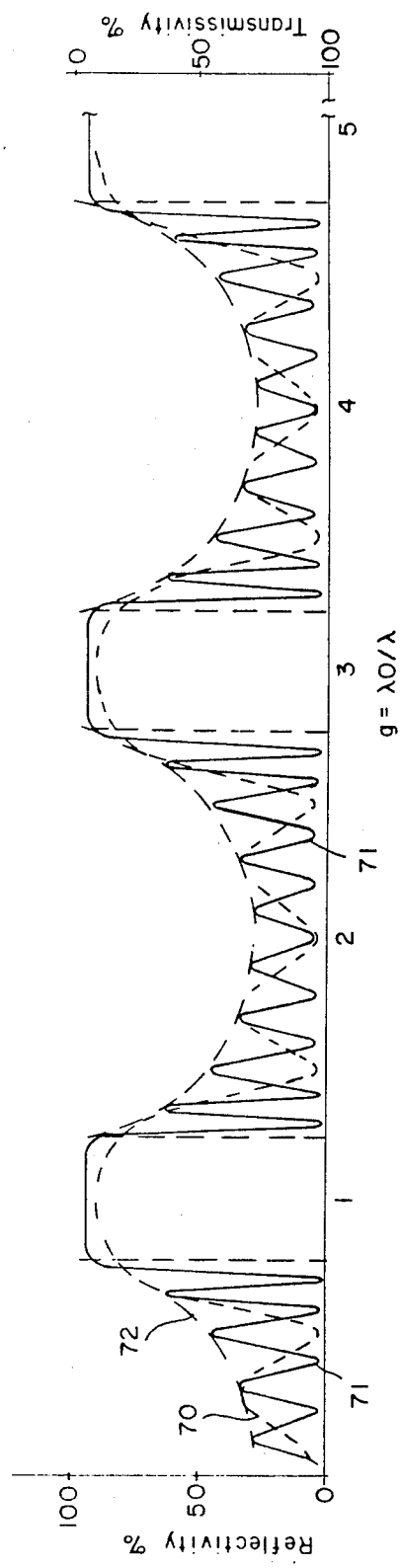
FIG. 3 is a graph representing transmittance or a multilayered interference filter.

Referring to FIG. 3, the reflectivity of several multilayer interference filters (not shown) will now be described by reference to the characteristic filter curves. The curve 70 consisting of short dashed lines is representative of the reflectivity of a four-layer interference filter, i.e., $(LH)^2$, and the solid line 71 is representative of a ten-layer, i.e., $(LH)^5$, interference filter. The long dashed line 72 is representative of the maximum envelope of reflectivity of an interference filter having an infinite number of L and H layers. Each of the multilayer interference filters are deposited on a glass substrate suspended in an air medium. The index of refraction of the L layer is 1.35 and the index of refraction for the H layer is 4.00. It is apparent from curves 70 and 71 that the maximum reflectivity peaks are closer together in the filter having more layers because of the additional reflectivity provided by additional layers. It is also apparent that there is not only a primary bandpass in the area where $\lambda_o/\lambda = 1$ but there are also secondary bandpass regions in the areas where $\lambda_o/\lambda = 3, 5,$ etc. It is pointed out that both the wavelengths to be passed by an interference filter and the ones to be reflected by it must be taken into consideration since there are secondary bandpass regions in such filters.

For a more detailed discussion of both antireflecting coatings and interference filters refer to the following works: "Infrared Physics and Engineering" by Jamieson, et al., Chapter 7-9, 7-13 and 7-14; "Infrared Systems Engineering" by Richard D. Hudson, Jr., Chapter 5.10; "Handbook of Military Infrared Technology" by William L. Wolfe, Chapter 7.4 and 8.6.

Figure 6:
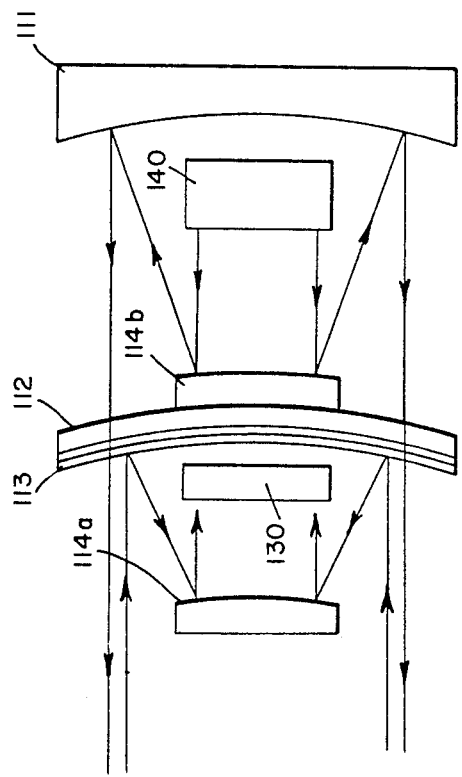
FIG. 6 is a schematic representation of a system using still another embodiment of the present invention.
Figure 4:
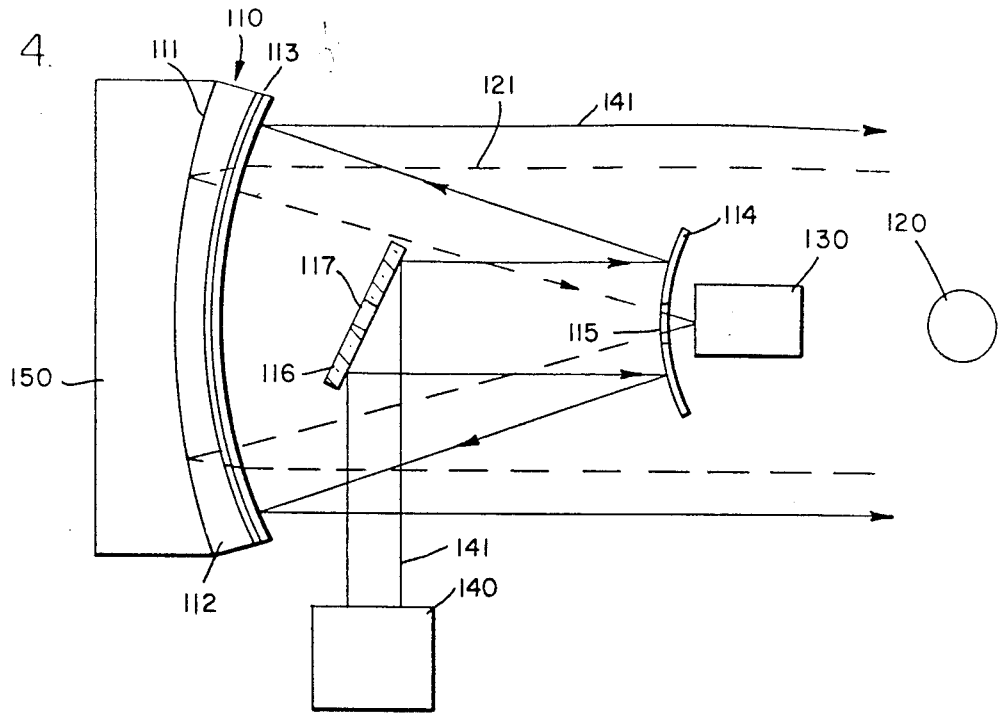
FIG. 4 is a schematic representation of a system using another embodiment of the present invention as the primary dichroic reflector.
Figure 5:
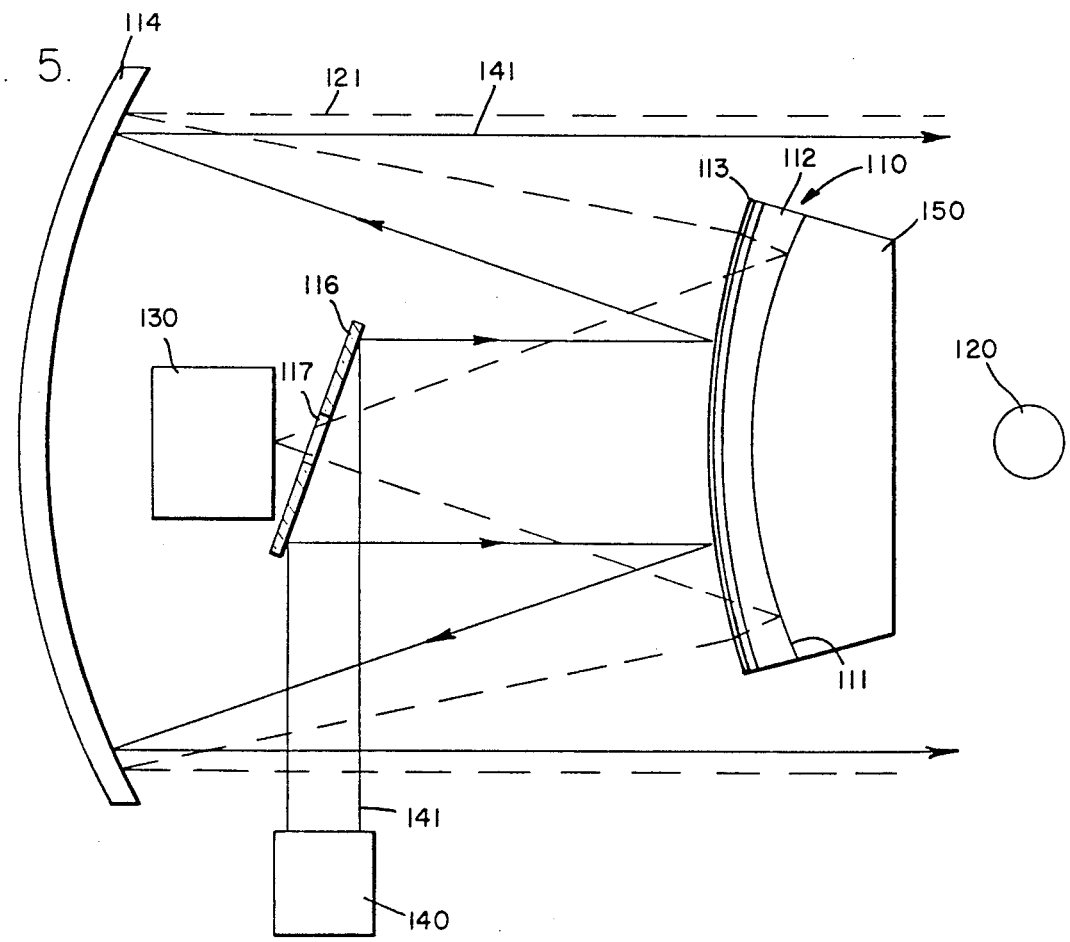
FIG. 5 is a schematic representation of a system using an embodiment of the present invention as a secondary dichroic reflector.

A laser optical system according to other embodiments of the present invention is illustrated in FIGS. 4, 5 and 6. Components in the embodiments of FIGS. 4 and 5 which are similar to respective components in the embodiment of FIG. 1 are designated by the same reference numerals as their corresponding components in FIG. 1 except for the addition of the prefix numeral 1.

The embodiment of FIG. 4 is similar to a Cassegranian optical system and differs from the embodiment of FIG. 1 in that the catadioptric beamsplitter 110 may be a reflecting surface that provides a focal point for energy that impinges thereupon. As utilized in the embodiment of FIG. 4, the catadioptric beamsplitter 110 is a primary reflector as distinguished from a flat folding-type beamsplitter 10 of FIG. 1. The reflector 111 may have a shape for providing a focal point including but not limited to such shapes as a hyperboloid, a paraboloid, a spheroid, or an ellipsoid. The reflector 111 has a first focal point $f_{111}$ for the energy impinging upon the reflecting surface which, for purposes of discussion here, is the first wavelength. The meniscus-shaped lens 112 provides optical power to the energy passing therethrough as the wedge-shaped lens 12 provides in FIG. 1. The second surface of the lens 112 has the same shape as the reflector 111. The filter 113 is the same type as filter 13 and serves the same function of passing a signal having a first wavelength while reflecting a signal with a second wavelength. The filter 113 is deposited on the first surface of the meniscus-shaped lens 112. Since the first and second surfaces of the meniscus-shaped lens 112 have different radii of curvature, the energy reflected from the first surface will converge at a focal point $f_{113}$, whereas energy reflected by the reflector 111 will converge at a different focal point $f_{111}$. It is again pointed out that the filter 113 passes energies having a first wavelength and reflects energies having a second wavelength to a focal point $f_{113}$. The embodiment of FIG. 4 further utilizes a second reflector 114 and a folding mirror 116 in conjunction with the primary reflector 110. The secondary plain mirror reflector 114 has a shape similar to that of the primary reflector 110, i.e., spherical or hyperbolic and is placed within the focal length of the primary reflector 110. The secondary reflector has an opening 115 at its center and an IR detector 130 is placed behind the opening 115 for receiving the incoming IR wave 121. The folding mirror 116 is centrally located between the primary reflector 110 and the secondary reflector 114 for directing a laser beam 141 from a laser 140 to the secondary reflector 114. An opening 117 is centrally located on the folding mirror 116 and is aligned with the opening 115 on the secondary reflector 114. The opening 117 in the folding mirror 116 allows a portion of the laser wave to pass therethrough instead of being reflected directly into the IR detector 130 and thereby causing extensive damage to the detector 130. The embodiment of FIG. 4 may also utilize a cooling member 150 to conduct away any heat that may be absorbed by the beamsplitter 110 from the laser beam 141.

In operation, the second embodiment of the present invention according to FIG. 4 receives an IR wave 121 from a distant target heat source 120. The IR wave passes through the filter 113, is refracted by the lens 112, and is reflected by the reflector 111 toward the opening 115 in the secondary reflector 114. The IR detector 130 may operate in a conventional manner to detect the incoming IR energy 121. The laser beam 141 from a laser 140 is directed at the folding mirror 116 which reflects onto the secondary reflector 114. The secondary reflector 114 reflects the laser beam to the filter 113 which reflects onto the distant source heat 120. It is to be noted that in other arrangements within the scope of the invention the laser energy may also be intercepted or received passing in a direction along the line 141 opposite from that shown by the arrows.

A third embodiment of the present invention is now discussed with a reference to FIG. 5. The embodiment of FIG. 5 is also a Cassegranian type system similar to the embodiment of FIG. 4 except that the catadioptric beamsplitter 110 is utilized as a secondary reflector and the primary reflector 114 is now a plain mirror. A folding mirror 116 having an opening 117 at its center is centrally located between the primary and secondary reflectors. The third embodiment also uses an IR detector 130, and a cooling member 150. It is further pointed out that the reflector 111 and the filter 113 have different radii of curvature and therefore have different focal points $f_{111}$ and $f_{113}$.

As discussed above, the system of FIG. 5 can also receive laser energy within the scope of the invention. The operation of the embodiment according to FIG. 5 is similar to the operation of the embodiment of FIG. 4. As in FIG. 4, the catadioptric beamsplitter 110 provides a first focal point $f_{111}$ for energy having a first wavelength and a second focal point $f_{113}$ for energies having a second wavelength thereby separating and directing energies according to wavelength.

It is also pointed out that the principles of the present invention may be equally applicable to other optical systems including, for example, a Gregorian type system which utilizes a concave primary reflector in conjunction with a concave secondary reflector. It is further pointed out that the principles of the present invention may be utilized in conjunction with energies having preselected wavelengths of other than IR in the 3–5$\mu$ range and a laser beam of 10.6$\mu$.

FIG. 6 depicts yet another embodiment of the present invention wherein the reflector 111 is separated from the lens 112 and the filter 113 instead of being joined together as in the above embodiments. The filter 113 (primary reflector) and the mirror 114a (secondary reflector) form a Cassegranian type optical system for waves having a first wavelengths. Signals having the first wavelength are directed to a detector 130. The lens 112, the reflector 111 (primary reflector), and mirror 114b (secondary reflector) form a second Cassegranian type optical system for waves having a second wavelength. The filter 113 passes signals having a second wavelength while it reflects signals having a first wavelength. In the application of FIG. 6, the filter 113 and the reflector 111 may have the same or different focal lengths depending upon the spatial constraints for the entire system.

It should be apparent from the foregoing that the present invention provides a simple and accurate laser optical system for tracking an infrared heat source and directing a laser beam thereto. Heretofore, a lens attached to a reflector forming a catadioptric reflector has been used mainly for correcting aberration in the reflector. The present invention provides a new and novel way of utilizing the lens in a catadioptric reflector in conjunction with an interference filter for providing wavelength dependent focal lengths.

Although the present invention has been shown and described with reference to particular embodiments, nevertheless, various changes and modifications obvious to one skilled in the art to which the invention pertains are deemed to lie within the purview of the invention.

What is claimed is:

1. An optical tracking system for tracking a target by a first wave and directing a second wave thereto, comprising:

reflecting means having first and second planar reflecting surfaces, said reflecting means including a lens defining a wedge, said lens having a selected index of refraction for providing a predetermined refraction of a first infrared wave having a first wavelength passing therethrough, said first and second reflecting surfaces being disposed on opposite faces of said wedge lens, said first reflecting surface for reflecting said first infrared wave to infrared detector means, said first infrared wave being received from a first direction, said second reflecting surface being transmissive to said first infrared wave and being reflective to a second infrared wave having a second wavelength, said second reflecting surface for receiving said second infrared wave from a second direction and reflecting said second infrared wave along said first direction;

infrared detector means for receiving said first infrared wave; and laser means for emitting said second infrared wave from said second direction.

2. An optical tracking system for tracking a target by a first wave and directing a second wave thereto, comprising:

reflector means having first and second planar reflecting surfaces, said reflecting means including a lens defining a wedge, said lens having a selected index of refraction for providing a predetermined refraction of a second infrared wave having a second wavelength passing therethrough, said first and second reflecting surfaces being disposed on opposite faces of said wedge lens, said first reflecting surface for reflecting said first infrared wave having a first wavelength to infrared detector means, said first infrared wave being received from a first direction, said first reflecting surface being transmissive to said second infrared wave, said second reflecting surface for receiving said second infrared wave from a second direction and reflecting said second infrared wave along said first direction;

infrared detector means for receiving said first infrared wave; and laser means for emitting said second infrared wave from said second direction.

3. An optical tracking system for receiving a first wave from a target and for transmitting a second wave thereto, comprising:

primary reflector means having first and second reflecting surfaces with first and second focal lengths, respectively, said primary reflector means including a lens being of a material having a preselected index of refraction for providing a predetermined refraction for a first infrared wave passing therethrough, said infrared wave having a first wavelength, said lens being disposed between said first and second reflecting surfaces, said first reflecting surface for reflecting said first infrared wave to infrared detector means, said first infrared wave being received from a first direction, said second reflecting surface being transmissive to said first infrared wave and being reflective to a second infrared wave having a second wavelength, said second reflecting surface for receiving said second infrared wave from a secondary reflector and reflecting said second infrared wave along said first direction;

secondary reflector means for reflecting said second infrared wave to said primary reflector;

infrared detector means for receiving said first infrared wave; and laser means for emitting said second infrared wave.

4. An optical tracking system for tracking a target by a first wave having a first wavelength and directing thereto a second wave having a second wavelength comprising:

primary reflector means having a first reflecting surface with a first focal length for reflecting a first infrared wave, said primary reflector means having a second reflecting surface with a second focal length for reflecting a second infrared wave, said first and second reflecting surfaces having a common optical axis, said primary reflector means having a lens with a selected index of refraction for providing a predetermined refraction of said first infrared wave passing therethrough, said first reflecting surface for reflecting said first infrared wave to infrared detector means, said first infrared wave being received along said common optical axis, said second reflecting surface being transmissive to said first infrared wave and being reflective to said second infrared wave, said second reflecting surface for receiving said second infrared wave from secondary reflector means and reflecting said second infrared wave along said common axis;

secondary reflector means for receiving said second infrared wave from laser means and for reflecting said second infrared wave to said primary reflector means;

infrared detector means for detecting said first infrared wave; and laser means for emitting said second infrared wave.

5. An optical tracking system for tracking a target by a first wave having a first wavelength and directing thereto a second wave having a second wavelength comprising:

primary reflector means having a first reflecting surface with a first focal length for reflecting a first infrared wave, said primary reflector means having a second reflecting surface with a second focal length for reflecting a second infrared wave, said first and second reflecting surfaces having a common optical axis, said primary reflector means having a lens with a selected index of refraction for providing a predetermined refraction of said second infrared wave passing therethrough, said first reflecting surface for receiving said first infrared wave being received along said common axis and reflecting said first infrared wave to infrared detector means, said first reflecting surface being transmissive to said second infrared wave, said second reflecting surface for receiving said second infrared wave from secondary reflector means and reflecting said second infrared wave along said common axis;

secondary reflector means for receiving said second infrared wave from laser means and reflecting said second infrared wave to said primary reflector means;

infrared detector means for detecting said first infrared wave; and laser means for emitting said second infrared wave.

6. An optical tracking system for tracking a target by a first wave having a first wavelength and directing thereto a second wave having a second wavelength comprising:

primary reflector means for receiving a first infrared wave from said target and reflecting said first infrared wave to secondary reflector means, said primary reflector for receiving a second infrared wave from said secondary reflector means and reflecting said second infrared wave to said target;

secondary reflector means having a first reflecting surface with a first focal length for receiving said first infrared wave from said primary reflector and reflecting said first infrared wave to infrared detector means, said secondary reflector means having a second reflecting surface with a second focal length for receiving said second infrared wave from laser means and reflecting said second infrared wave to said primary reflector means, said second reflecting surface being transmissive to said first infrared wave, said secondary reflector having a lens with a selected index of refraction for providing a predetermined refraction of said first infrared wave passing therethrough;

infrared detector means for detecting said first infrared wave; and laser means for emitting said second infrared wave.

7. An optical tracking system for tracking a target by a first wave having a first wavelength and directing thereto a second wave having a second wavelength comprising:

primary reflector means for receiving a first infrared wave from said target and reflecting said first infrared wave to secondary reflector means, said primary reflector for receiving a second infrared wave from said secondary reflector means and reflecting said second infrared wave to said target;

secondary reflector means having a first reflecting surface with a first focal length for receiving said first infrared wave from said primary reflector and reflecting said first infrared wave to infrared detector means, said secondary reflector means having a second reflecting surface with a second focal length for receiving said second infrared wave from laser means and reflecting said second infrared wave to said primary reflector means, said first reflecting surface being transmissive to said second infrared wave, said secondary reflector having a lens with a selected index of refraction for providing a predetermined refraction of said second infrared wave passing therethrough;

infrared detector means for detecting said first infrared wave; and laser means for emitting said second infrared wave.

\* \* \* \* \*